(12) United States Patent
Sharma et al.

(10) Patent No.: US 6,975,744 B2
(45) Date of Patent: Dec. 13, 2005

(54) DETECTION OF MULTIPLE WATERMARKS AND IMPROVED WATERMARK CALIBRATION SIGNALS

(75) Inventors: Ravi K. Sharma, Hillsboro, OR (US); Osama M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 686 days.

(21) Appl. No.: 10/032,282

(22) Filed: Dec. 20, 2001

(65) Prior Publication Data

US 2002/0114491 A1 Aug. 22, 2002

Related U.S. Application Data

(60) Provisional application No. 60/257,924, filed on Dec. 21, 2000.

(51) Int. Cl.[7] .............................................. H04K 1/00
(52) U.S. Cl. ................................................... 382/100
(58) Field of Search ............................... 382/100, 232; 380/210, 252, 287, 54; 713/176

(56) References Cited

U.S. PATENT DOCUMENTS

| | | | |
|---|---|---|---|
| 5,949,055 A | 9/1999 | Fleet et al. | 235/469 |
| 6,011,857 A | 1/2000 | Sowell et al. | 382/100 |
| 6,044,182 A | 3/2000 | Daly et al. | 382/284 |
| 6,282,300 B1 * | 8/2001 | Bloom et al. | 382/100 |
| 6,385,329 B1 | 5/2002 | Sharma et al. | 382/100 |
| 6,408,082 B1 | 6/2002 | Rhoads et al. | 382/100 |
| 6,516,079 B1 | 2/2003 | Rhoads et al. | 382/100 |
| 6,563,937 B1 * | 5/2003 | Wendt | 382/100 |
| 6,577,747 B1 * | 6/2003 | Kalker et al. | 382/100 |
| 6,614,914 B1 | 9/2003 | Rhoads et al. | 382/100 |
| 6,665,418 B1 * | 12/2003 | Honsinger | 382/100 |
| 6,671,388 B1 * | 12/2003 | Op De Beeck et al. | 382/100 |
| 6,678,390 B1 * | 1/2004 | Honsinger | 382/100 |
| 2002/0114490 A1 * | 8/2002 | Taniguchi et al. | 382/100 |

FOREIGN PATENT DOCUMENTS

WO    WO 99/45706 A2 *  9/1999   .......... H04N 5/913

OTHER PUBLICATIONS

Ó Ruanaidh et al., "Rotation, scale and translation invariant spread spectrum digital image watermarking," Signal Processing, vol. 66, May 1998, pp. 303-317.*

Kutter, "Watermarking resisting to translation, rotation, and scaling," Proc. SPIE vol. 3528: Multimedia Systems and Applications, Nov. 1998, pp. 423-431.*

(Continued)

Primary Examiner—Andrew W. Johns
(74) Attorney, Agent, or Firm—Digimarc Corporation

(57) ABSTRACT

Steganographic calibration signals (sometimes termed "orientation signals," "marker signals," reference signals," "grid signals," etc.) are sometimes included with digital watermarking signals so that subsequent distortion of the object thereby marked (e.g., a digital image file, audio clip, document, etc.) can later be discerned and compensated-for. Digital watermark detection systems sometimes fail if the object encompasses several separately-watermarked components (e.g., a scanned magazine page with several different images, or photocopy data resulting from scanning while several documents are on the photocopier platen). Each component may include its own calibration signal, confusing the detection system. In accordance with certain embodiments, this problem is addressed by a proximity-based approach, and/or a multiple grid-based approach. In accordance with other embodiments, the calibration signal can—itself—convey watermark information, so it serves both a calibration and a payload-conveyance function.

12 Claims, 3 Drawing Sheets

OTHER PUBLICATIONS

Pereira et al., "Template Based Recovery of Fourier-Based Watermarks Using Log-Polar and Log-log Maps," Proc. IEEE Int. Conf. on Multimedia Computing and Systems, vol. 1, Jun. 1999, pp. 870-874.*

Lin et al., "Rotation, scale, and translation resilient public watermarking for images," Proc. SPIE vol. 3971: Security and Watermarking of Multimedia Contents II, Jan. 2000, pp. 90-98.*

Su et al., "An Image Watermarking Scheme to Resist Generalized Geometrical Transforms," Proc. SPIE vol. 4209: Multimedia Systems and Applications III, Nov. 2000, pp. 354-365.*

Su et al., "Synchronized Detection of the Block-based Watermark with Invisible Grid Embedding," Proc. SPIE vol. 4314: Securi and Watermarking of Multimedia Contents III, Jan. 2001, pp. 406-417.*

Lin et al., "Rotation, Scale, and Translation Resilient Watermarking for Images," IEEE Transactions on Image Processing, vol. 10, No. 5, May 2001, pp. 767-782.*

Nikolaidis et al., "Region-Based Image Watermarking," IEEE Transactions on Image Processing, vol. 10, No. 11, Nov. 2001, pp 1726-1740.*

* cited by examiner

250
DETECTION OF MULTIPLE WATERMARKS AND IMPROVED WATERMARK CALIBRATION SIGNALS

RELATED APPLICATION DATA

This application claims priority benefit to copending provisional application 60/257,924, filed Dec. 21, 2000.

FIELD OF THE INVENTION

The present invention relates to digital watermark technology, and particularly concerns situations in which several digitally watermarked objects are presented to a watermark detector.

BACKGROUND AND SUMMARY OF THE INVENTION

Digital watermarking systems are known in the art, and are shown, e.g., in applications Ser. No. 09/503,881 (now U.S. Pat No. 6,614,914) and Ser. No. 09/452,023 (now U.S. Pat. No. 6,408,082).

Steganographic calibration signals (sometimes termed "orientation signals," "marker signals," reference signals," "grid signals," etc.) are sometimes included with digital watermarking signals so that subsequent distortion of the object thereby marked (e.g., a digital image file, audio clip, document, etc.) can later be discerned and compensated-for. Such arrangements are detailed in the cited applications.

Systems for detecting watermarks from marked objects sometimes fail if the image object encompasses several separately-watermarked components (e.g., a scanned magazine page with several different images, or photocopy data resulting from scanning while several documents are on the photocopier platen, as shown in FIG. 1). Each component may include its own calibration signal, confusing the detection system.

In accordance with certain embodiments of the present invention, this problem is addressed by a proximity-based approach, and/or a multiple grids-based approach.

In accordance with other embodiments of the present invention, the calibration signal can—itself—convey the watermark information, so it serves both a calibration and a payload-conveyance function.

The foregoing and additional features and advantage of the present invention will be more readily apparent from the following detailed description, which proceeds with reference to the accompanying drawings.

DETAILED DESCRIPTION

For expository convenience, the following discussion focuses on the context of processing image data resulting from scanning several documents on the same photocopier platen. It should be recognized, however, that the invention is not so limited, but finds application, e.g., in contexts involving audio, video and other content objects.

Proximity Approach

The proximity approach is based on selecting and clubbing together image blocks that are in close proximity to each other. For two watermarked documents in an image, this approach would ideally give two clusters of blocks, one for each watermark. This approach requires modification to the methodology described in the '881 application. The prior methodology calculated the variance and edges in each block and used these to compute a metric for the block. Blocks were ranked based on their metric, and the top M blocks are selected to perform grid detection. The proximity approach, in contrast, takes into account the spatial locations of the blocks, and/or their distances to each other, for division into one or more clusters.

Such a proximity approach has several advantages. These include:

- Separate block clusters can be treated as independent sets of data for grid detection and further decoding.
- Except for the block clustering and proximity determination, prior art techniques (e.g., as in the '881 application) can remain unchanged.

Although the proximity-based approach overcomes many of the shortcomings of the prior art, it has attributes that may render it poorly suited for certain applications. For example:

- The proximity approach may result in blocks from a single watermarked document being divided into more than one cluster.
- The proximity approach may fail for multiple watermarked documents that are either overlapped or in close proximity to each other.
- The extensibility of this approach to situations where the number of watermarked components is more than two or three is uncertain.

These shortcomings are generally obviated by the multiple grids approach.

Multiple Grids Approach

The multiple grids approach tackles the problem by searching for multiple grids during grid detection. The approach is based on the notion that if there is more than one watermarked component, the accumulated Fourier magnitude should contain a grid signal corresponding to each watermark. The presence of multiple grids generates multiple strong peaks both at the log-polar correlation and Fourier magnitude correlation steps in the process. Each peak corresponds to the rotation and scale of the corresponding grid.

Figure 1:
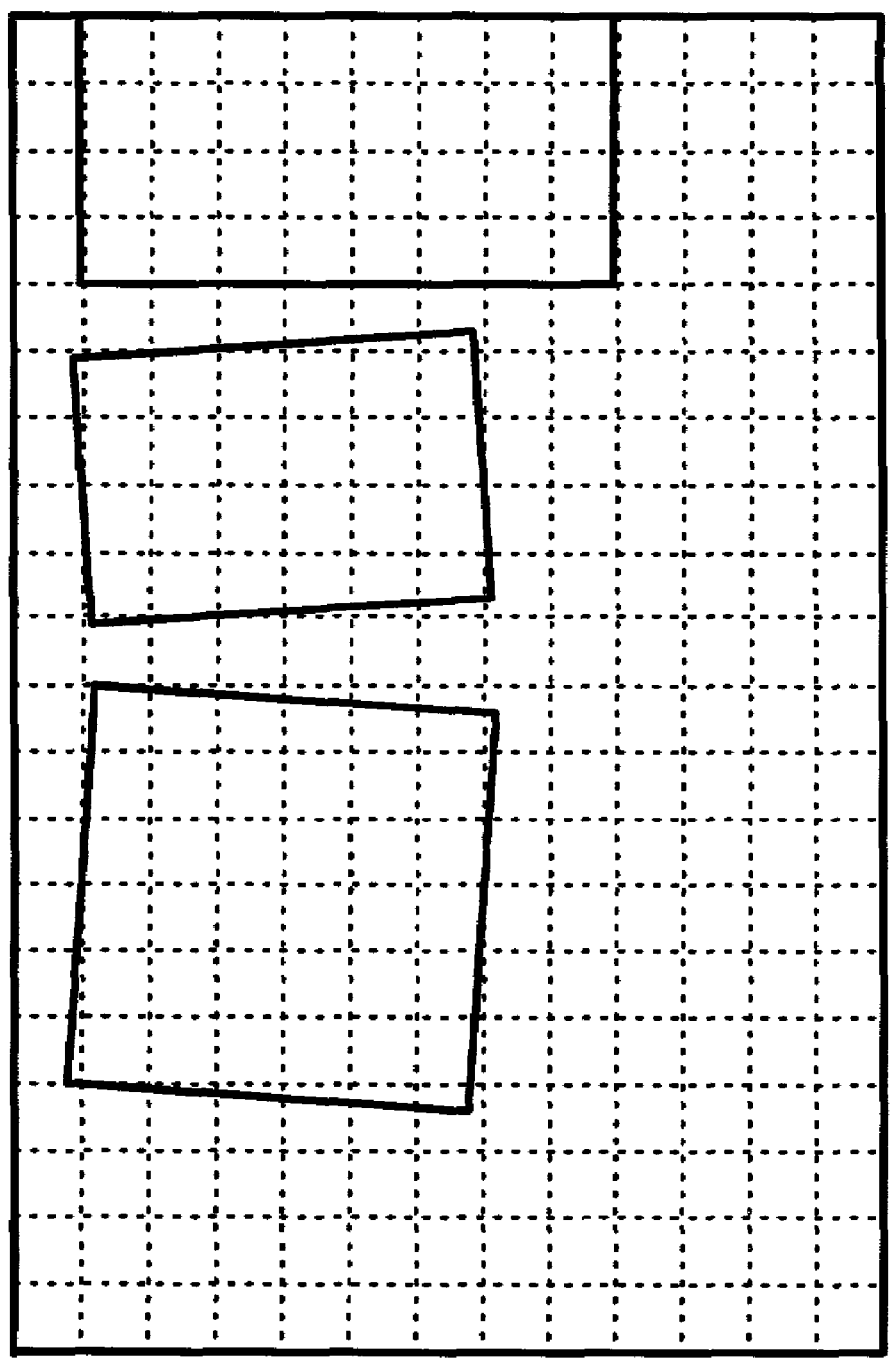
FIG. 1 shows several documents as they may be positioned on the platen of a photocopier.
Figure 2:
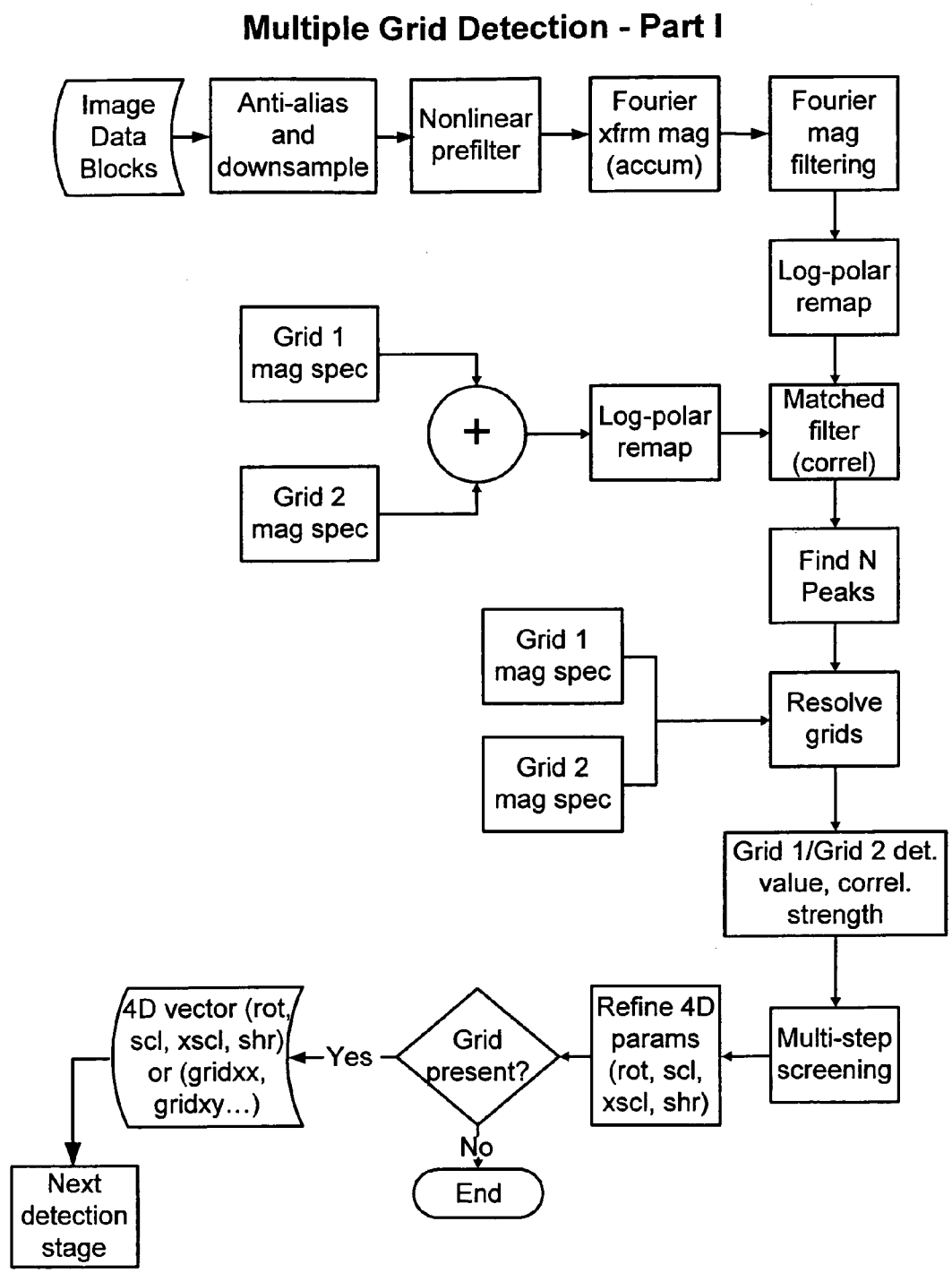
FIG. 2 is a flow chart detailing one embodiment of a multiple-grid detection approach.
Figure 3:
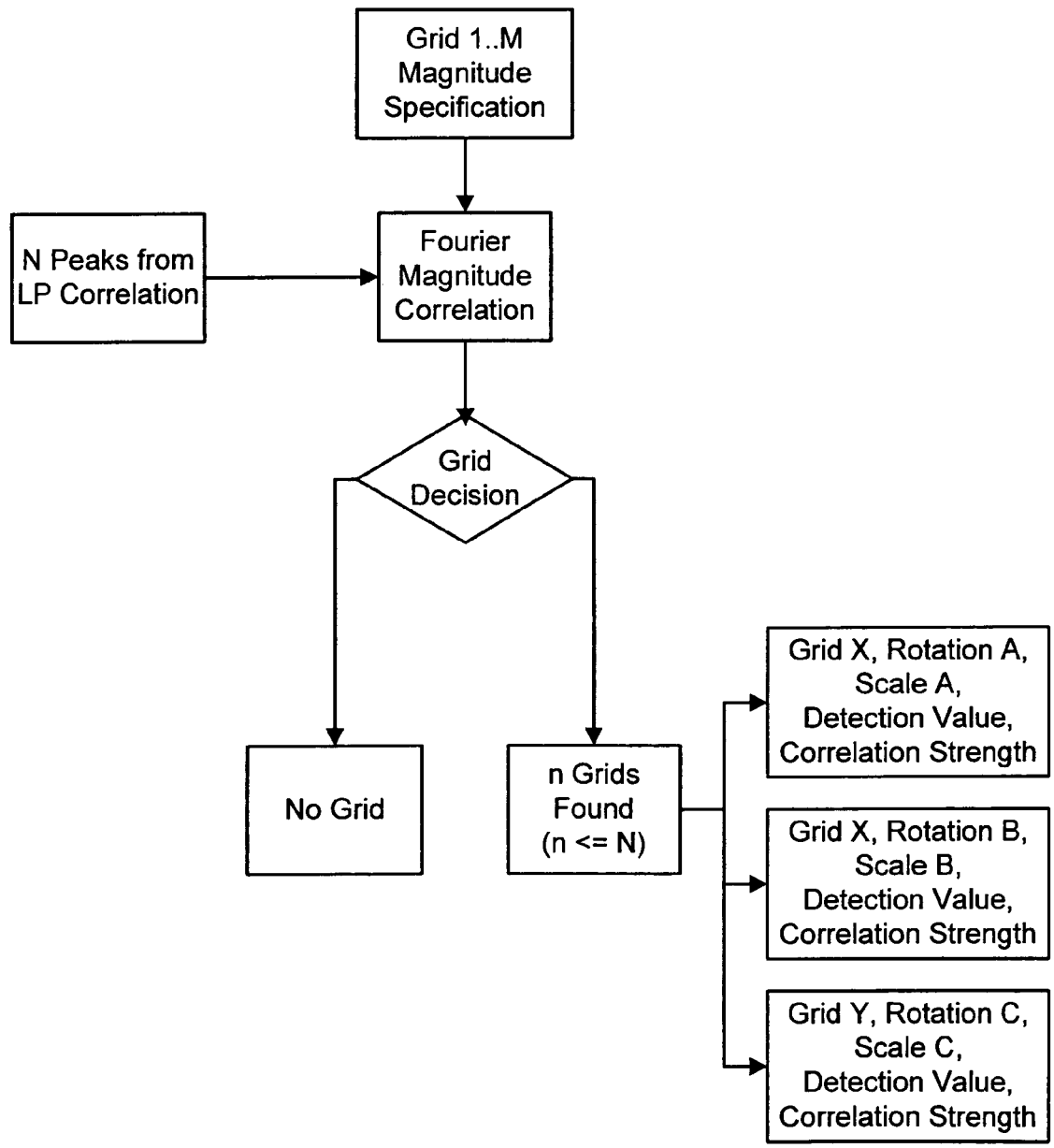
FIG. 3 is a flow chart further detailing the embodiment of FIG. 2.

The multiple grids approach can include certain of the steps detailed in FIGS. 2 and 3, which include the following:

- Segment the image into blocks;
- Apply a non-linear prefilter that estimates the image data (from the image+watermark input data) and subtracts its from the input data. (Estimation can be performed using the host signal estimation technique disclosed in application Ser. No. 09/278,049.)
- Compute the detection value corresponding to each of the N (e.g., 2–16) candidates in the Fourier Magnitude Correlation (FMC) step.
- Select the M candidates that surpass the two-step rejection criterion.
- Try refining scale/rotation on these M candidates to obtain refined rotation and scale as well as differential scale and shear (i.e., a 4D refinement vector).
- Loop through the M 4D vector sets and perform translation determination and read (decode) operations for each, using all available blocks.

Buffer the decoded watermark information from each of the M candidates (i.e., read or not read, if read what type of watermark, and so on).

Either return this information to the calling program, or select the watermark to return to the calling program based upon a predetermined priority ranking of the various possible watermarks.

This approach works as long as there is sufficient signal strength corresponding to each potential grid in the accumulated Fourier magnitude. Also note that this approach assumes that all the watermarks in the image have the same grid. Experiments using this approach have yielded promising results and shown that this approach is feasible.

Such an approach has various advantages, including:

It enables detection of multiple watermarks even if the multiple watermarked documents are overlapped or in close proximity to each other.

It does not affect the performance (speed) of the grid detection stage.

Most of the methodology parallels prior art techniques; the sequence of operations after the grid detection stage need to be repeated for each detected grid.

It is possible to extend this approach to situations where there are more than two or three watermarked components in an image.

A few shortcomings persist:

If the multiple watermarks are weak, it may be difficult to detect them in the accumulated Fourier magnitude.

One challenge in this approach arises if the multiple grids have almost the same rotation and scale. This limitation arises because the peak finding algorithm cannot resolve closely located peaks in the GMF correlation plane.

The two-step rejection criteria noted above is more particularly detailed in application Ser. No. 09/526,982 (now U.S. Pat. No. 6,516,079).

An exemplary grid signal is one with the following characteristics:

It comprises a collection of impulse or delta functions in the Fourier magnitude domain.

The impulse functions have pseudo random phase (i.e. the phase is random, yet known so that translation (its X and Y origin) of the watermark can be computed by correlating the phase information of the calibration signal with the watermarked signal)

The impulse functions are typically distributed in the mid-frequency range so as to survive distortion yet not be perceptible In other embodiments, different grid signals can be used in differently-watermarked excerpts of the content. FIGS. 2 and 3 more particularly detail a detection process useful in this context.

As before, the image is segmented into blocks, pre-filtered, the converted into the Fourier domain. The Fourier representation for all the component blocks are accumulated, filtered, and remapped into the log-polar domain.

In contrast to the multiple-same grid context, the multiple-different grid context process proceeds by correlating the log-polar representation obtained above, with a log-polar remapping of the Fourier magnitude representation of each of the component grid signals, summed together (a summed-grid template). This correlation yields several peaks, each indicating a candidate scale/rotation state of one of the component watermarked elements. But the peaks do not indicate the particular grid signals with which they correlated, since the correlation was based on a summed-grid template. Accordingly, the method proceeds by checking each discerned scale/rotation state (correlation peak) of the data against the Fourier magnitude spectrum of the different grid signals, to determine which grid signal should be used in decoding a given scale/rotation state of the data. Once this association between scale/rotation states of data, and applicable grid signal, has been determined, decoding of each can proceed as above (and in the cited applications).

Of course, for any single grid signal, there may be several objects represented in the data set—each with a different scale or rotation.

In accordance with yet another aspect of the invention, the impulse functions can be modulated to carry auxiliary information as follows:

Encode:
a. create message (e.g., binary bit string)
b. error correction encode and/or spread spectrum modulate the string
c. map elements of resulting message signal to fourier magnitude impulse function locations
d. encode 1 as positive impulse function and encode 0 as negative impulse function (or other predetermined relation)

Detect and decode message:
a. detect impulses to determine whether a watermark is present;
b. if detected, then go back and check for the presence at predetermined Fourier Magnitude impulse function locations;
c. perform inverse of spread spectrum modulation and error correction coding to recover original message Note that there are many possible applications: The calibration signal can carry protocol information to tell the decoder how to interpret the message payload of another watermark signal.

In systems in which the "grid" signal conveys the message, there is no need for separate "grid" and "message" signals.

For additional information on the use of the grid signal to convey payload information, see application Ser. No. 09/618,948 (now U.S. Pat. No. 6,385,329).

Thus, for example, one embodiment is a method of encoding a digital content object with a watermark that represents both payload data and calibration data, where the method includes:

defining a grid signal comprising a plurality of components in the Fourier domain;

setting the polarities of said components in accordance with payload data to be represented thereby; and combining said grid signal with the digital content object to digitally watermark same In such an arrangement, affine transformation of the digital content object can be discerned from affine transformation of the grid signal, and the payload can be discerned from the polarities of the grid signal components.

In the foregoing embodiment, the watermark may include other components in addition to those of which the grid signal is comprised. These other components can serve to convey additional payload data.

The payload data represented by the polarities of said grid signal components can convey various types of information, such as protocol information.

Having described and illustrated the principles of our inventive work with reference to specific embodiments, it will be recognized that the principles thereof can be implemented in other, different, forms.

For example, while the disclosure focused on image data, the same techniques are applicable in other watermarking contexts, including audio and video.

Moreover, while the invention was illustrated in the context of the present assignee's preferred forms of watermarking, it should be recognized that the invention's applicability is not so limited. For example, such techniques also find utility in combination with the teachings of watermarking U.S. Pat. Nos. 5,949,055, 6,044,182, etc.

It should be recognized that the particular combinations of elements and features in the above-detailed embodiments are exemplary only; the interchanging and substitution of these teachings with other teachings in this and the incorporated-by-reference patents/applications are also contemplated.

As is familiar to those skilled in the arts, all of the foregoing methods may be performed using dedicated hardware components/systems for the various devices, and/or through use of processors programmed in accordance with firmware or software, etc. In the latter case the processors may each include a CPU and associated memory, together with appropriate input and output devices/facilities. The software can be resident on a physical storage media such as disks, and can be loaded into the processors' memory for execution. The software includes instructions causing the CPU to perform the various processes detailed above.

To provide a comprehensive disclosure without unduly lengthening this specification, the patents and applications cited above are incorporated herein by reference.

In view of the wide variety of embodiments to which the principles of our inventive work can be applied, it should be recognized that the detailed embodiments are illustrative only and should not be taken as limiting the scope of the invention. Rather, we claim as our invention all such embodiments as may come within the scope and spirit of the following claims, and equivalents thereof.

We claim:

1. A method of decoding watermark data from digital data representing a content object, the object including first and second parts conveying first and second different watermarks, the method comprising:
    segregating the digital data into more than two portions;
    selecting a first group of proximate portions and combining same into a first excerpt;
    selecting a second group of proximate portions and combining same into a second excerpt; and
    separately decoding the first and second excerpts to decode the first and second different watermarks therefrom.

2. A method of decoding watermark data from digital data representing a content object, the object including plural parts conveying plural different watermarks, each of the watermarks including embedded information to facilitate decoding even if the content object is subject to at least one form of affine transformation, the method comprising:
    generating from the digital data a set of data having the embedded information from said watermarks expressed therein;
    discerning first and second transformation information from said set of data, said transformation information related to affine transformations of first and second watermarks;
    processing a portion of the digital data in accordance with the first transformation information to decode the first watermark;
    processing a portion of the digital data in accordance with the second transformation information to decode the second watermark.

3. The method of claim 2 in which said portions include at least some of said digital data in common.

4. The method of claim 2 that includes searching said set of data for relative extreme that helps characterize affine transformation of said watermarks.

5. The method of claim 2 in which the portion of digital data processed in accordance with the first transform information represents some part of the content object conveying the second watermark, wherein the presence of said second watermark does not interfere with decoding of the first watermark since the first transformation information is used in processing.

6. A method of decoding watermark data from digital data representing a content object, the object including plural parts each conveying a different watermark, each of the watermarks including a characteristic pattern evident in the Fourier transform domain by which affine transformation of the corresponding part can be discerned, the method comprising:
    providing blocks of the digital data in the Fourier domain;
    accumulating Fourier magnitude data across plural of said blocks;
    remapping the accumulated data into a log-polar domain;
    providing a summed-grid template representing a summation of Fourier magnitude data corresponding to said plural characteristic patterns, represented in said log-polar domain;
    analyzing the remapped accumulated data in accordance with said summed-grid template to discern candidate affine states;
    for at least some of said candidate affine states, determining the characteristic pattern to which each corresponds; and
    attempting to decode a watermark from a portion of the digital data in accordance with a first of said candidate affine states and a characteristic pattern determined to correspond thereto.

7. The method of claim 6 that includes attempting to decode a watermark from a portion of the digital data in accordance with a second of said candidate affine states, and a characteristic pattern determined to correspond thereto.

8. The method of claim 7 in which the characteristic pattern corresponding to said first affine state is determined to be different than the characteristic pattern corresponding to the second affine state.

9. A method of encoding a digital content object with a watermark that represents both payload data and calibration data, comprising:
    defining a calibration signal comprising a plurality of components in the Fourier domain;
    setting the polarities of said components in accordance with payload data to be represented thereby; and
    combining said calibration signal with the digital content object to digitally watermark same;
    wherein affine transformation of the digital content object can be discerned from affine transformation of the calibration signal, and the payload can be discerned from the polarities of the calibraton signal components.

10. The method of claim 9 in which the watermark includes other components in addition to those of which the calibration signal is comprised, said other components serving to convey additional payload data.

11. The method of claim 9 in which the payload data represented by the polarities of said calibration signal components serves to convey protocol information.

12. The method of claim 9 wherein said components comprise impulse or delta functions in the Fourier magnitude domain.

* * * * *